US012694137B2

(12) United States Patent
Yang et al.

(10) Patent No.: US 12,694,137 B2
(45) Date of Patent: ***Jul. 28, 2026

(54) LOGICAL LOG VISIBILITY CONTROL IN ENCLAVE DATABASE

(71) Applicant: Beijing Volcano Engine Technology Co., Ltd., Beijing (CN)

(72) Inventors: Xinying Yang, Beijing (CN); Yang Liu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 235 days.

This patent is subject to a terminal disclaimer.

(21) Appl. No.: 18/416,420

(22) Filed: Jan. 18, 2024

(65) Prior Publication Data

US 2025/0238531 A1      Jul. 24, 2025

(51) Int. Cl.
*G06F 21/62* (2013.01)
*G06F 21/60* (2013.01)

(52) U.S. Cl.
CPC ........ *G06F 21/604* (2013.01); *G06F 21/6227* (2013.01); *G06F 2221/2113* (2013.01); *G06F 2221/2141* (2013.01)

(58) Field of Classification Search
USPC .......................................................... 726/1
See application file for complete search history.

(56) References Cited

U.S. PATENT DOCUMENTS

| | | | |
|---|---|---|---|
| 8,201,216 B2 * | 6/2012 | Cha ..................... | G06F 21/6227 726/1 |
| 10,133,746 B1 | 11/2018 | Mccline et al. | |
| 10,977,384 B2 * | 4/2021 | Benaloh ............. | G06F 21/6245 |
| 2011/0067084 A1 | 3/2011 | Byun et al. | |
| 2020/0175183 A1 * | 6/2020 | Ramasamy ............ | G06F 21/30 |
| 2020/0265159 A1 * | 8/2020 | Schmatz ................ | H04L 9/008 |
| 2021/0377020 A1 * | 12/2021 | Kashid .................... | H04L 9/083 |
| 2023/0085763 A1 | 3/2023 | Soundararajan | |
| 2023/0269093 A1 * | 8/2023 | Ben-Ari ............... | H04L 9/0897 713/175 |

OTHER PUBLICATIONS

Office Action in U.S. Appl. No. 18/416,497, mailed on Jan. 16, 2026, 11 pages.

* cited by examiner

*Primary Examiner* — Sanchit K Sarker
(74) *Attorney, Agent, or Firm* — Fish & Richardson P.C.

(57) ABSTRACT

A database management system (DBMS) in an enclave for a data privacy preservation database is provided. The system includes a system catalog table, a logical log, and a DBMS engine. The engine is configured to parse the logical log based on a request to retrieve the logical log to detect at least one predetermined identifier, and to distribute the logical log. The engine is also configured, for each predetermined identifier being detected in the logical log, to determine an access control of the request with respect to a field of the data privacy preservation database corresponding to a record in the system catalog table, and to retrieve secret data corresponding to the field when the access control indicating a first access control status or mask the secret data corresponding to the field when the access control indicating a second access control status.

17 Claims, 8 Drawing Sheets

200

300

301

302

500

LOGICAL LOG VISIBILITY CONTROL IN ENCLAVE DATABASE

FIELD

The embodiments described herein pertain generally to a data privacy control for a database. More specifically, the embodiments described herein pertain to a fine-grained data privacy control for a data privacy preservation database through a database management system (DBMS) in an enclave.

BACKGROUND

Conventional hardware-enabled encrypted database (H-EDB) systems support more operations (e.g., database operations using Structured Query Language (SQL), etc.) compared to software-oriented encrypted database (S-EDB) systems, but still far less than general database systems (e.g., SQL database systems, etc.). Conventional H-EDB systems typically have a partially hardware encrypted (P-HE) architecture that shares a client-side private key using Remote Attestation (RA) mechanism and registers authenticated DBMS operator code within the enclave. Once cipher-text from an end (e.g., a user end, etc.) is delivered (e.g., through the DBMS, etc.) to the enclave, the enclave first decrypts the cipher-text to plaintext, performs computations or operations on the plaintext, and then encrypts the computed plaintext (if needed) before replying to the DBMS.

Typically P-HE databases are designed based on the constraint of the enclave, e.g., the constraint of the trusted execution environment (TEE) memory limitation or restrictions. Therefore, it may be impractical to authenticate the entire DBMS into an enclave to achieve a fully hardware encrypted (F-HE) database system for runtime execution, and the input/output (I/O) cost in the P-HE database between the enclave and the DBMS may affect the system performance significantly.

SUMMARY

Recent emergence of increased TEE memory may enable creation of an F-HE architecture. Features in the embodiments disclosed herein may provide and otherwise implement an "in-enclave" (i.e., F-HE) database system (e.g., a relational database system, etc.) to support the data privacy-preserving and verifiable functionalities by residing the entire DBMS (or the entire database system) into the TEE (e.g., the TEE memory, etc.), which may reform the current P-HE model.

It is to be understood that, in the F-HE database architecture, the mechanism may provide security and/or protect privacy by preventing data leaks for all memory, processor(s) such as central processing units (CPUs), and I/O. As such, the DBMS-internally-used data structures and data stores that do not have explicit retrieval interfaces (e.g., system and physical logs), may be prevented from being viewed by adversaries. For example, a redo log of a database system, which is a physical log, stores all changes made to a database in log files. Thus, operations involving the redo log may include the redo log being loaded into the memory and participating in the processor (such as the CPU, etc.) computation, being written and read by disk I/O as a log file, and being transmitted between replicas through the network I/O. None of the operations pertaining to the redo log leak data in the F-HE paradigm because the enclave memory and the CPU are protected to ensure security and privacy;

further, data may be encrypted by the enclave or TEE before written on the disk, and the network transmission may be secured e.g., by Remote Attestation-Transport Layer Security (RA-TLS) protocol.

It is also to be understood that in the F-HE database architecture, for data structures and data stores (e.g., logical log, etc.) that have some explicit retrieval interfaces, additional security and/or privacy protections need to be in place. Features in the embodiments disclosed herein may provide a logical log encoding and mask-enabled visibility control to achieve efficient privacy-preserving database logical log in the F-HE, which may reform the client-side cryptography (e.g., using the RA mechanism, etc.) in the conventional P-HE databases. That is, features in the embodiments disclosed herein may achieve the secure and/or privacy protection without the need of the client-side cryptography and the corresponding processes related to the client-side cryptography.

In one example embodiment, a database management system (DBMS) in an enclave for a data privacy preservation database is provided. The system includes a system catalog table, a logical log, and a DBMS engine configured to parse the logical log based on a request to retrieve the logical log to detect at least one predetermined identifier. The engine is also configured to, for each predetermined identifier being detected in the logical log, determine an access control of the request with respect to a field of the data privacy preservation database corresponding to a record in the system catalog table; and to retrieve secret data corresponding to the field when the access control indicating a first access control status, or mask the secret data corresponding to the field when the access control indicating a second access control status. The engine is further configured to distribute the logical log having the retrieved or masked secret data based on the request.

In another example embodiment, method for data privacy control for a data privacy preservation database is provided. The method includes parsing, by a database management system (DBMS) in an enclave, a logical log based on a request to retrieve the logical log to detect at least one predetermined identifier. The method also includes, for each predetermined identifier being detected in the logical log, determining an access control of the request with respect to a field of the data privacy preservation database corresponding to a record in a system catalog table; and retrieving secret data corresponding to the field when the access control indicating a first access control status, or masking the secret data corresponding to the field when the access control indicating a second access control status. The method further includes distributing the logical log having the retrieved or masked secret data based on the request.

In yet another example embodiment, a non-transitory computer-readable medium having computer-executable instructions stored thereon is provided. The instructions, upon execution, cause one or more processors to perform operations including parsing, by a database management system (DBMS) in an enclave, a logical log based on a request to retrieve the logical log to detect at least one predetermined identifier; for each predetermined identifier being detected in the logical log: determining an access control of the request with respect to a field of a data privacy preservation database corresponding to a record in a system catalog table, retrieving secret data corresponding to the field when the access control indicating a first access control status or masking the secret data corresponding to the field when the access control indicating a second access control status; and distributing the logical log having the retrieved or masked secret data based on the request.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
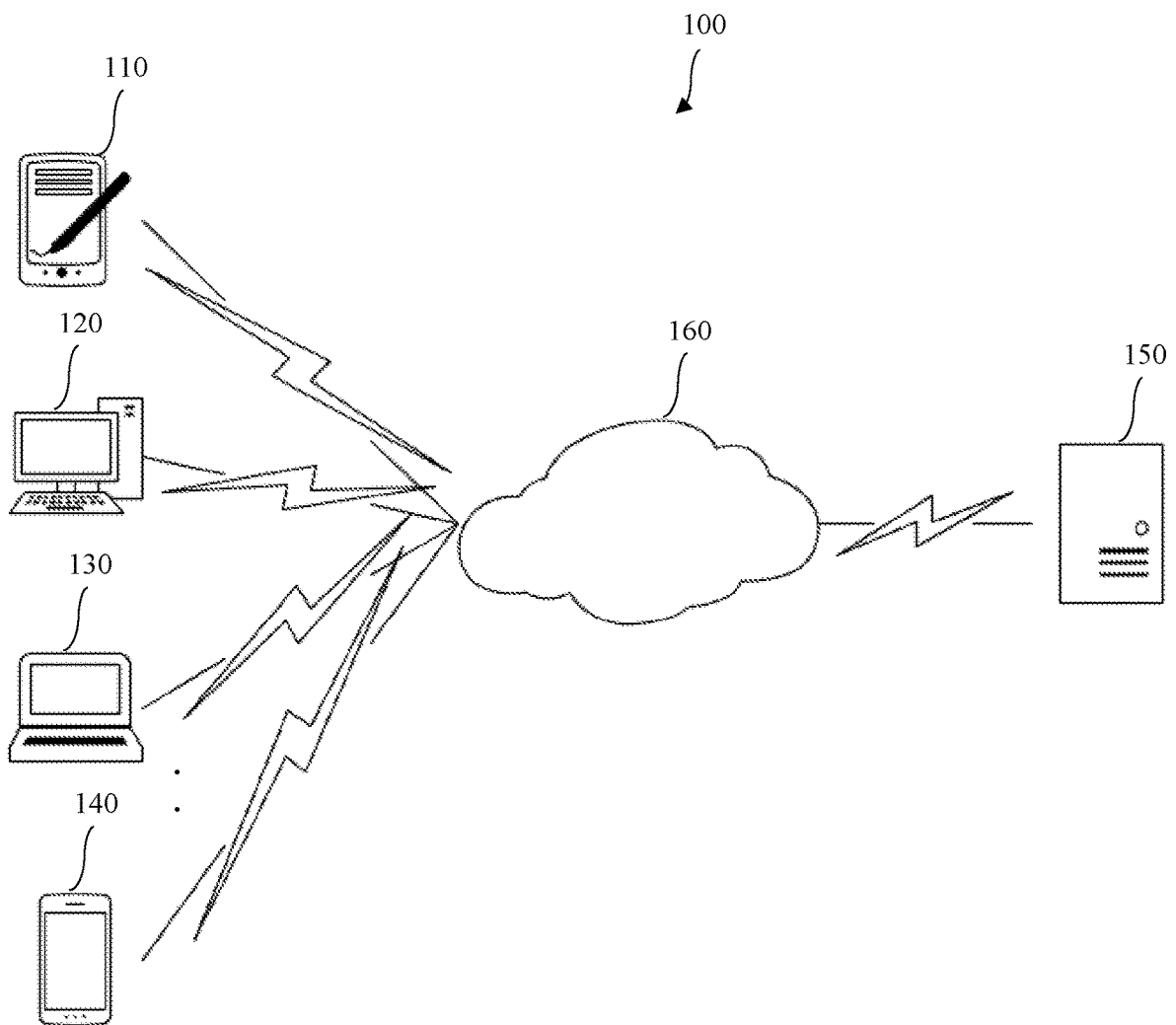
FIG. 1 is a schematic view of an example data privacy preservation database system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "database" is a term of art that may refer to an organized collection of data or a type of data store based on the use of a database management system (DBMS), the software that interacts with end users, applications, and/or the database itself to capture and analyze the data. As referenced herein, a "database server" is a term of art that may refer to a server which uses a database application that provides database services to other computer programs or to computers, as defined by the client-server model. It is to be understood that some DBMS may typically provide database-server functionality, and that some DBMS may rely exclusively on the client-server model for database access. It is also to be understood that the DBMS may additionally encompass the core facilities provided to administer the database; and that the sum total of the database, the DBMS, and the associated applications may be referred to as a database system. In an example embodiment, the database system may be a relational database system that may optionally use Structured Query Language (SQL) for querying and updating the database. It is further to be understood that a database may include one or more database tables, with every column of a database table representing a particular variable or field, and each row of the database table corresponding to a given record or entry. The table may list values for each of the variables or fields, and/or for each record or entry.

As referenced herein, a "DBMS engine" or a "database engine" is a term of art that may refer to the software or algorithm(s) in a database system that recognizes and interprets database commands (e.g., SQL commands, etc.) to access a database and interrogate data in the database. In an example embodiment, a DBMS engine may include an SQL engine (or an SQL query engine).

As referenced herein, an "enclave" is a term of art that may refer to a trusted execution environment (TEE) that may protect sensitive data and code, e.g., from attackers that control, attempt to control, or have otherwise compromised the operating system and the hypervisor on a host machine. It is to be understood that an enclave or TEE may refer to a set of system resources (e.g., memory, input/output, processors such as central processing units, etc.) that operate in a common security domain and that share the protection of a single, common, continuous security perimeter. In an example embodiment, an enclave or TEE may refer to a private region of memory designed to be protected from processes running at higher privilege levels. It is also to be understood that an enclave or TEE may refer to a secure area to help code and data loaded inside it to be protected with respect to confidentiality and integrity. Data integrity prevents unauthorized entities from outside the enclave or TEE from altering data, while code integrity prevents code in the enclave or TEE from being replaced or modified by unauthorized entities, which may include the computer owner or operator itself. This may be done by implementing confidential architectural security which offers hardware-based memory encryption that isolates specific application code and data in memory. An enclave or TEE may be an isolated execution environment that provides security features such as isolated execution, integrity of applications executing with the enclave or TEE, along with confidentiality of their assets. That is, the enclave or TEE may offer an execution space that provides a higher level of security for trusted applications running on the device than an operating system.

As referenced herein, a "fine-grained" or "granular" data privacy preservation is a term of art that may refer to a method, program, or system of preserving data privacy with respect to a certain portion of data or a certain aspect of data. In an example embodiment, a fine-grained data privacy preservation database may provide a fine-grained data privacy preservation mechanism e.g., to protect data privacy of one or more columns/fields (and/or one or more rows/records) of a database table. In contrast, "coarse-grained" data privacy preservation is a term of art that may refer to a method, program, or system of preserving data privacy for generalized data privacy control. In an example embodiment, a coarse-grained data privacy preservation database may provide a coarse-grained data privacy preservation mechanism e.g., to protect data privacy of an entire database table (e.g., based on a user's role or permission, etc.) instead of a certain portion of the database table or a certain aspect of the database table.

As referenced herein, a "logical log" in a database is a term of art that may refer to a log file (e.g., a circular file, etc.) containing log records generated by e.g., the database server (e.g., the DBMS, etc.) to keep a history of transactions and database server changes since the time of the last storage-space backup. The log records in the logical log represent logical operations of the database server, as opposed to physical operations. As referenced herein, a "physical log" in a database is a term of art that may refer to a log file containing the contents of each row/record that is changed. Typically, logical logging includes logging not the changed rows/records but rather the database commands (e.g., SQL statements, etc.) that lead to the row/record changes (e.g., the insert, update, and/or delete statements, etc.). Logical logs may describe changes in the form of a record mirror or command (e.g., a SQL statement, etc.). Physical logging includes logging the contents of each row/record that is changed. Physical logs may describe the changes in a way that is more partial to the underlying data block operation. In an example embodiment, a logical log may include an audit-log, while a physical log may include a redo log. It is to be understood that although the logical log is used as an example in describing the features of the embodiments, any other suitable file that has similar characteristics to the logical log may be applicable.

As referenced herein, a "system catalog" table in a database is a term of art that may refer to table(s) and/or view(s) that describe the structure of the database. It is be understood that the system catalog table may refer to the data dictionary, which may contain everything that the database knows about itself.

As referenced herein, "structured data" in a database is a term of art that may refer to pre-formatted data, the format of which is pre-defined in rows/records and columns/fields and typically stored as a table. It is to be understood that structured data may be categorized as quantitative data, and may be highly organized and easily understood by machine language. Structured data may be inputted, searched, and/or manipulated easily using the DBMS. In an example embodiment, a database table (e.g., a system catalog table, etc.) is structured data. As referenced herein, "unstructured data" in a database is a term of art that may refer to complex, qualitative, and/or unorganized data that may not conform to any one particular standard (e.g., unstructured data may be numerical, alphabetical, Boolean, etc. or a mix of some or all of them), and may not be stored in a database since the data strings may have mixed datatypes which cannot fit into either a row/record or a column/field of a table. In an example embodiment, a log file (e.g., physical log, logical log, etc.) is unstructured data.

FIG. 1 is a schematic view of an example data privacy preservation database system 100, arranged in accordance with at least some embodiments described herein.

The system 100 may include terminal devices 110, 120, 130, and 140, a network 160, and/or a server 150. It is to be understood that the server 150 may be a database server that provides database services to other computer programs or to computers, as defined by a client-server model. The terminal devices 110, 120, 130, and 140 may be the device(s) used to query (or operate, e.g., analyze, process, use, store, share, access, etc.) the database on or from the server. It is also to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as database applications, social media applications, online shopping applications, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may optionally include the network 160 while including the terminal device 110, 120, 130, and 140, or the server 150.

It is further to be understood that the terminal device 110, 120, 130, and 140 and the server 150 may each include one or more processors, a memory, and a storage device storing one or more programs. Each of the terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
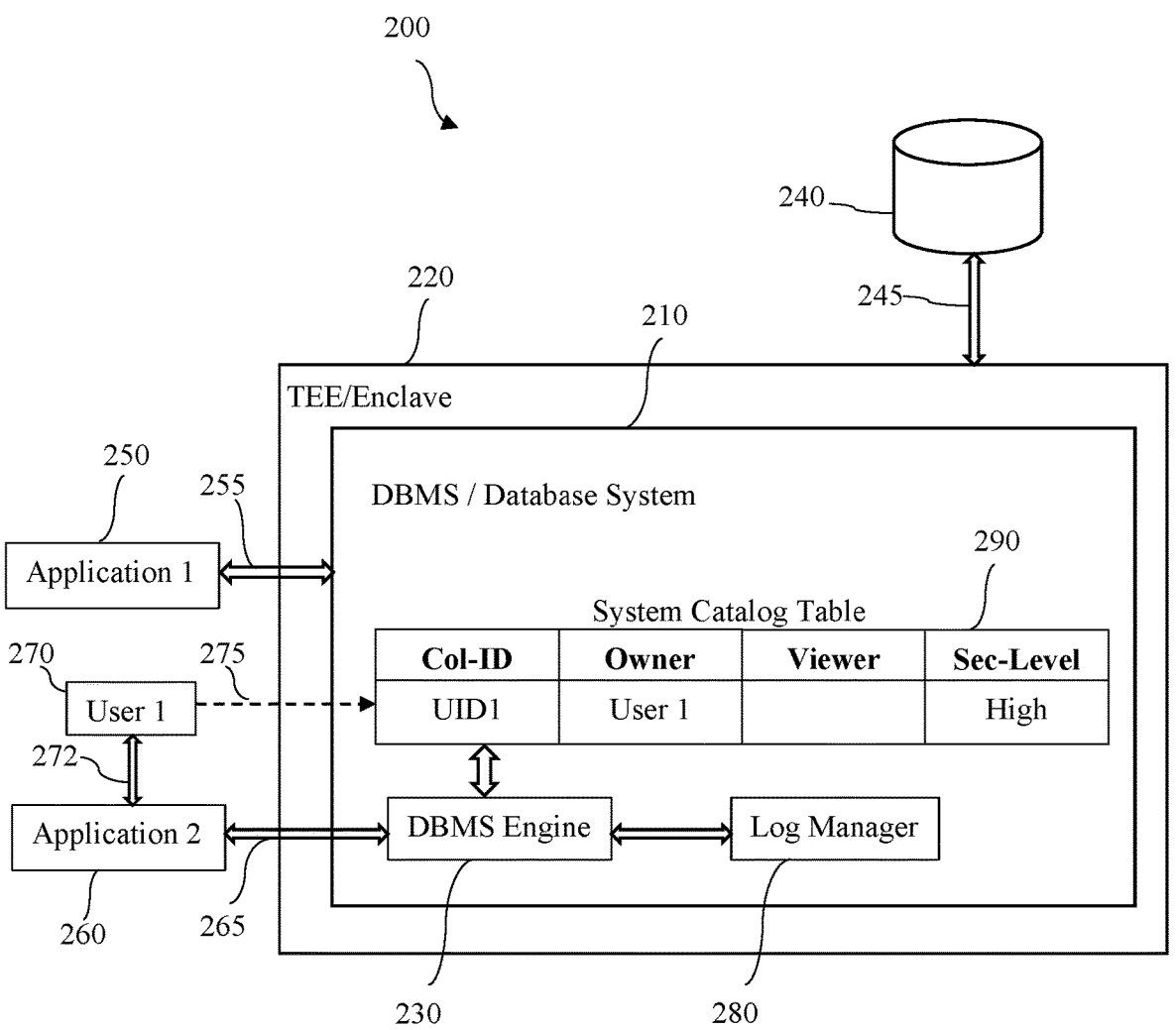
FIG. 2 is a schematic view of an architecture for a database system, in accordance with at least some embodiments described herein.

FIG. 2 is a schematic view of an architecture for a database system 200, in accordance with at least some embodiments described herein. It is to be understood that the processes disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

As shown in FIG. 2, the database system 200 includes a DBMS 210. In an example embodiment, the DBMS 220 may reside entirely in an enclave 220. The enclave 220 may be a trusted execution environment (TEE), which may be a set of encrypted system resources (e.g., memory, input/output, processors such as central processing units, etc.). The DBMS 220 may include DBMS engine 230. In an example embodiment, the DBMS engine 230 may be an SQL engine. The DBMS engine 230 may be designed, programmed, or otherwise configured to receive database commands (e.g., SQL statements, etc.) from a user 270 via application(s) 260, to generate/create or operate/access/manipulate one or more database tables 290, and/or communicate with or control one or more tools or processes such as the log manager 280.

In an example embodiment, the one or more database tables 290 may be loaded e.g., by the DBMS 210 to the enclave 220 from the storage 240 via an encrypted channel 245 such as e.g., a trusted execution environment-input/output transport layer security (TEE-IO TLS) channel, etc. In an example embodiment, the one or more database tables

290 may be saved in, stored in, or sent to the storage 240 from the enclave 220 e.g., by the DBMS 210 via the encrypted channel 245.

In an example embodiment, the application 260 may be executed on a device such as the terminal device 110, 120, 130, and 140 of FIG. 1, corresponding to or operated by user 270, and/or the server 150 of FIG. 1. The user 270 may be the owner or operator of the database, a database administrator (DBA), an authorized user given rights to access and/or modify the database of the database system 200, etc. A device corresponding to user 270 may run the application 260 or instruct the application 260 to execute by e.g., providing input 272 to the application 260 and/or receiving output 272 from the application 260. The application 260 may communicate with the DBMS engine 230 via e.g., secure network connections 265. The application 260 may be a fine-grained privacy-preserving application, a tamper-resistant application, or any other suitable application(s).

In an example embodiment, a device corresponding to a user (not shown), such as the terminal device 110, 120, 130, and 140 of FIG. 1 and/or the server 150 of FIG. 1 may run or execute the application 250. The user may be the owner of the database, a database administrator (DBA), an authorized user given rights to access and/or modify the database of the database system 200, etc. The application 250 may communicate with the DBMS 210 (and/or the DMBS engine 230) via e.g., secure network connection(s) 255. The application 250 may be a coarse-grained privacy-preserving application or any other suitable application(s).

In an example embodiment, the one or more database tables 290 may include system tables such as system catalog table(s), user defined/generated tables, or any other suitable database tables, views, etc. The one or more database tables 290 may be the database table(s) of a privacy-preserving database (e.g., a fine-grained privacy-preserving database, etc.).

For example, the user 270 may be a human resource personnel. On a corresponding device, the user 270 may create or generate a payroll table (or database DB, not shown) which has columns/fields such as the name of the employee, the salary of the employee, etc. The creation or generation of the payroll table may be performed via the interface 272 (between the application 260 and the user 270) of the application 260 which sends the corresponding database command to the DBMS engine 230 for execution (i.e., for creating or generating the payroll table). That is, the user 270 may be the owner of the payroll table. When or after creating or generating the payroll table, the user 270 may send the database command 275 (e.g., creating the payroll table and/or selecting or designating one or more fields (such as the salary of the employee field, etc.) as secret or private column(s)/field(s)) so that the DBMS engine 230 may create or update the system catalog table 290. That is, the payroll table is considered to be a fine-grained privacy-preserving table/database since a portion (the salary of the employee field, etc.) of the table/database is protected from being viewed or accessed by any user (including the root user or DBA of the DBMS 210, etc.) except for the owner 270 (and/or viewers whose plaintext view permission to the secret/private field(s) is granted by the owner 270).

It is to be understood that the database command 275 is sent via the interface 272 of the application 260 which sends the corresponding database command 275 to the DBMS engine 230 for execution, i.e., for creating or updating the system catalog table to add a record/row and/or to insert or update (1) the unique identification (e.g., UID1) of the secret column/field (e.g., the salary of the employee field) of the payroll table to the column identification (e.g., Col-ID) field, (2) the user identification (e.g., User 1) of the owner/creator of the payroll table to the table/database owner (e.g., Owner) field, and/or (3) the secret or privacy setting (e.g., High) of UID1 of the payroll table to the secret level (e.g., Sec-Level) field. It is also to be understood that when the Sec-Level field is set or updated to "High" (or the like), the corresponding secret column/field (i.e., the salary of the employee field of the payroll table, etc.) may not be visible or otherwise accessible to any user (including the root user or DBA of the DBMS 210, etc.) except for the owner "User 1" (and/or viewers whose plaintext view permission to the secret/ private field(s) is granted by the owner) of the corresponding table/database (e.g., the payroll table). When the Sec-Level field is set or updated to "Medium" (or the like), some characteristics of the corresponding secret column/field (e.g., some aggregation of the salaries of the employees, etc.) may be visible or otherwise accessible to user(s) other than the owner and viewer(s), subject to other existing rule(s) regarding the permissions of the user(s). When the Sec-Level field is set or updated to "Low" (or the like), more characteristics (than the "Medium" level) of the corresponding secret column/field (e.g., some aggregation of the salaries of the employees, etc.) may be visible or otherwise accessible to user(s) other than the owner and viewer(s), subject to other existing rule(s) regarding the permissions of the user(s). In an example embodiment, "High", "Medium", and "Low" may be numeric values in an increased or decreased sequence or order, depending on the configuration or definition of the level(s). In another embodiment, the secret level (e.g., Sec-Level) field may be optional.

It is further to be understood that the device corresponding to user 270 may also send a database command (not shown) via the interface 272 of the application 260 which sends the corresponding database command to the DBMS engine 230 for execution, i.e., for creating or updating the system catalog table to add a record/row and/or to insert or update (1) the viewer(s) of the secret column/field (e.g., the salary of the employee field) of the payroll table to the viewer list (e.g., Viewer) field. In an example embodiment, regardless of the value of the "Sec-Level" field, the secret column/field (e.g., the salary of the employee field of the payroll table, etc.) may be visible to the owner (e.g., User 1) and the viewer(s) listed in the "Viewer" field.

It is also to be understood that a secret/private field (or fields) being visible to a user may indicate that the user may view the plaintext of the value/data of the secret/private field. A secret/private field (or fields) not being visible (or invisible) to a user may indicate that the user may not view the plaintext of the value/data of the secret/private field, may not view the secret/private field at all, and/or may view a masked data of the secret/private field. In an example embodiment, data being masked may indicate that the data is encoded, encrypted as ciphertext, masked by adding random value(s), and/or that the plaintext of the data is otherwise prevented from being viewed.

In an example embodiment, the DBMS engine 230 may include the log manager 280. In another example embodiment, the DBMS engine 230 may be independent to the log manager 280 and may communicate with, send commands to, control, and/or operate the log manager 280. During the operation of the DBMS 210, the log manager 280 may log (e.g., save, store, record, etc.) the database commands (e.g., SQL statements, etc.) that lead to e.g., the row/record changes (e.g., the insert, update, and/or delete statements, etc.) into a logical log (that may be generated, updated, parsed, and/or manipulated by the log manager 280). It is to be understood that unless explicitly described otherwise, all the database commands (e.g., SQL statements, etc.) including those described above, such as generating, accessing, updating, inserting, deleting, operating, manipulating, and/ or handling the secret/private column(s)/field(s), may be logged in the logical log. That is, the log manager 280 may log data changes in the database for different data manipulation operations (e.g., delete, insert, update, etc.) on the user-definable database objects (table(s), column(s)/field(s), etc.). It is also to be understood that the log manager 280 may generate, update, parse, manipulate, and/or handle any other suitable logs (e.g., system and/or physical log(s), etc.).

Figure 3A:
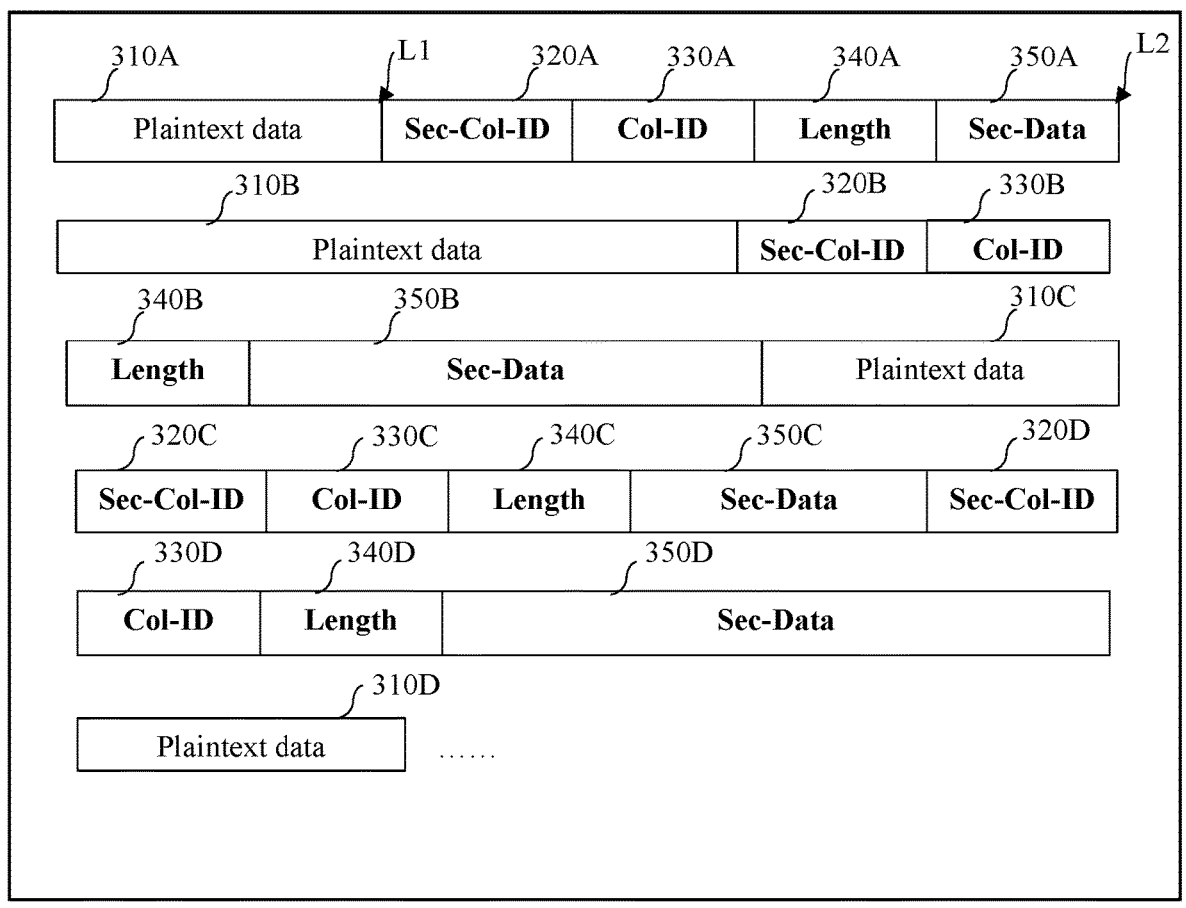
FIG. 3A is a schematic view of a logical log file for a data privacy preservation database, in accordance with at least some embodiments described herein.
Figure 3B:
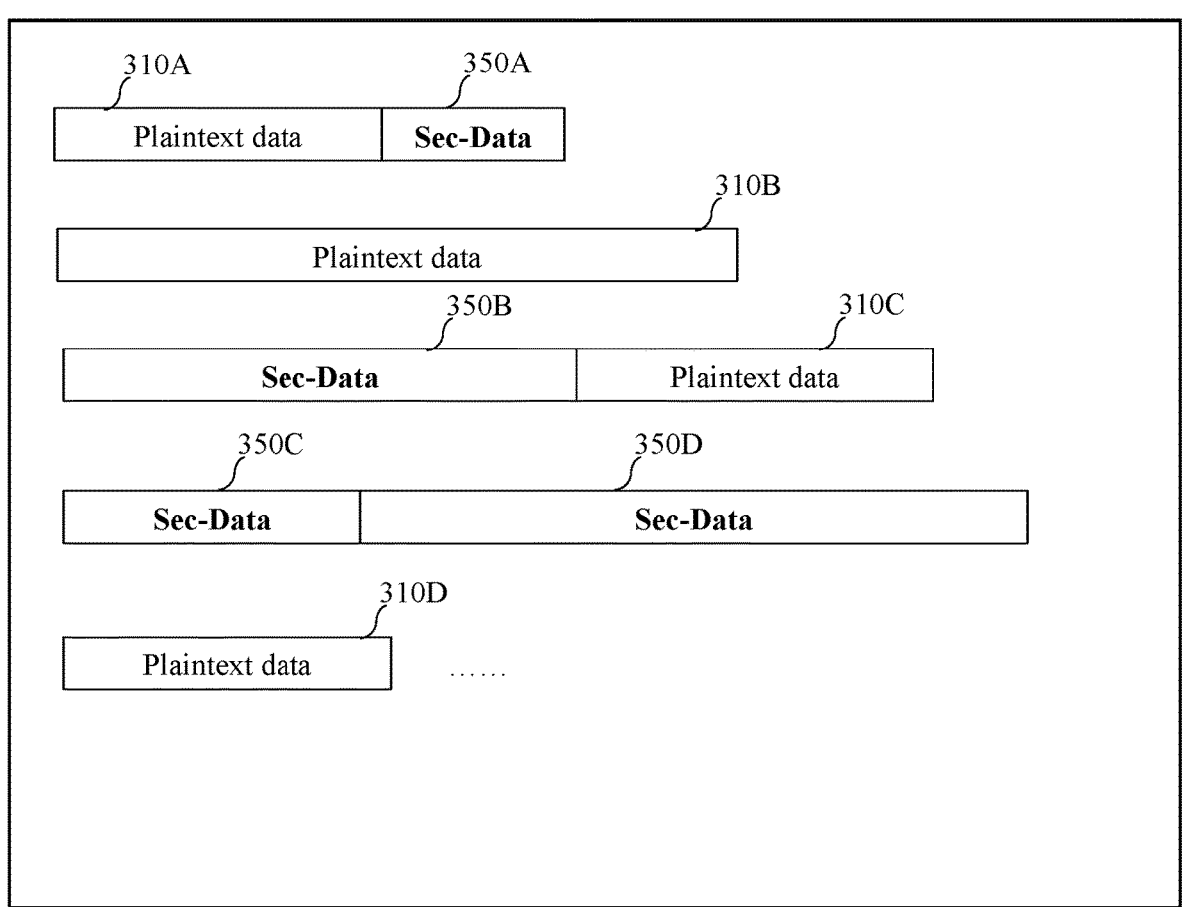
FIG. 3B is a schematic view of an output logical log file for a data privacy preservation database, in accordance with at least some embodiments described herein.
Figure 3C:
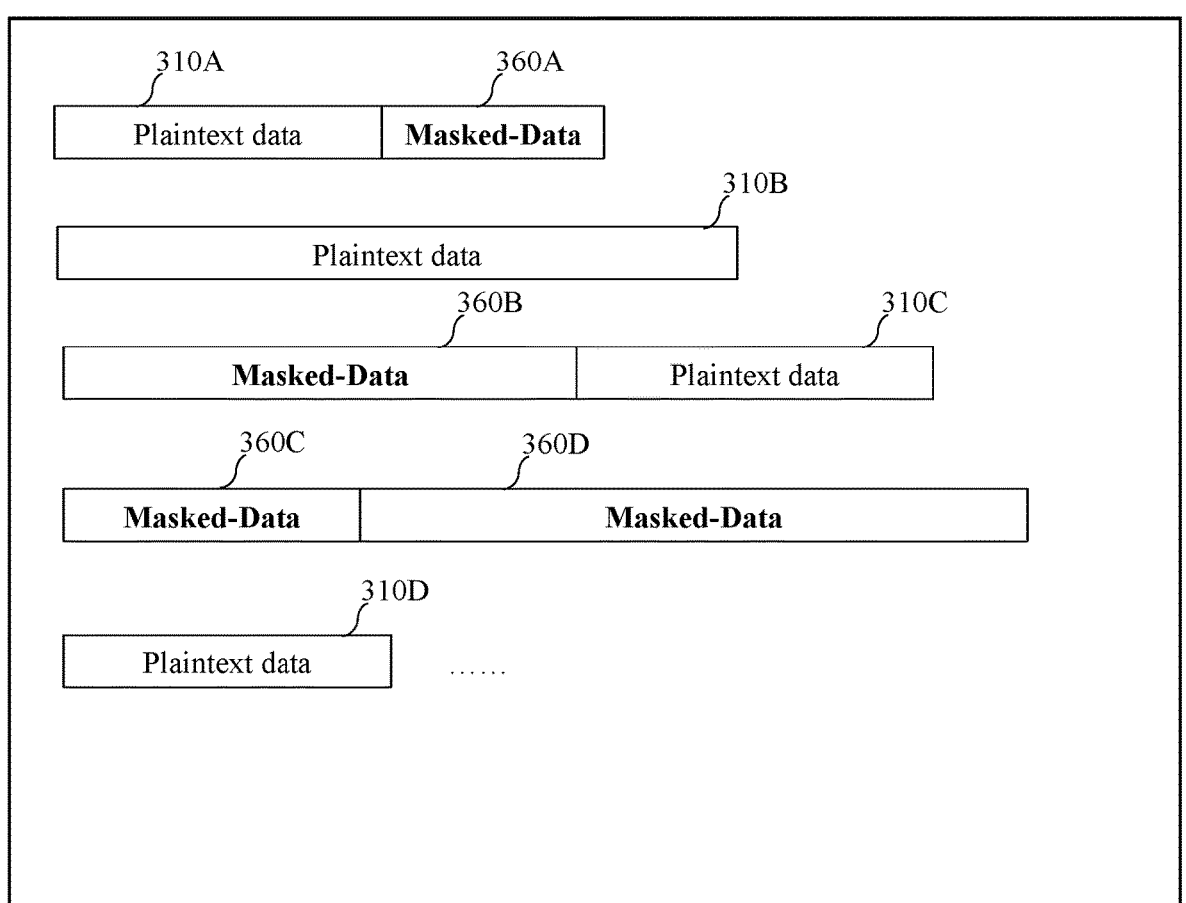
FIG. 3C is a schematic view of another output logical log file for a data privacy preservation database, in accordance with at least some embodiments described herein.
Figure 3D:
FIG. 3D is a schematic view of yet another output logical log file for a data privacy preservation database, in accordance with at least some embodiments described herein.
Figure 3D:
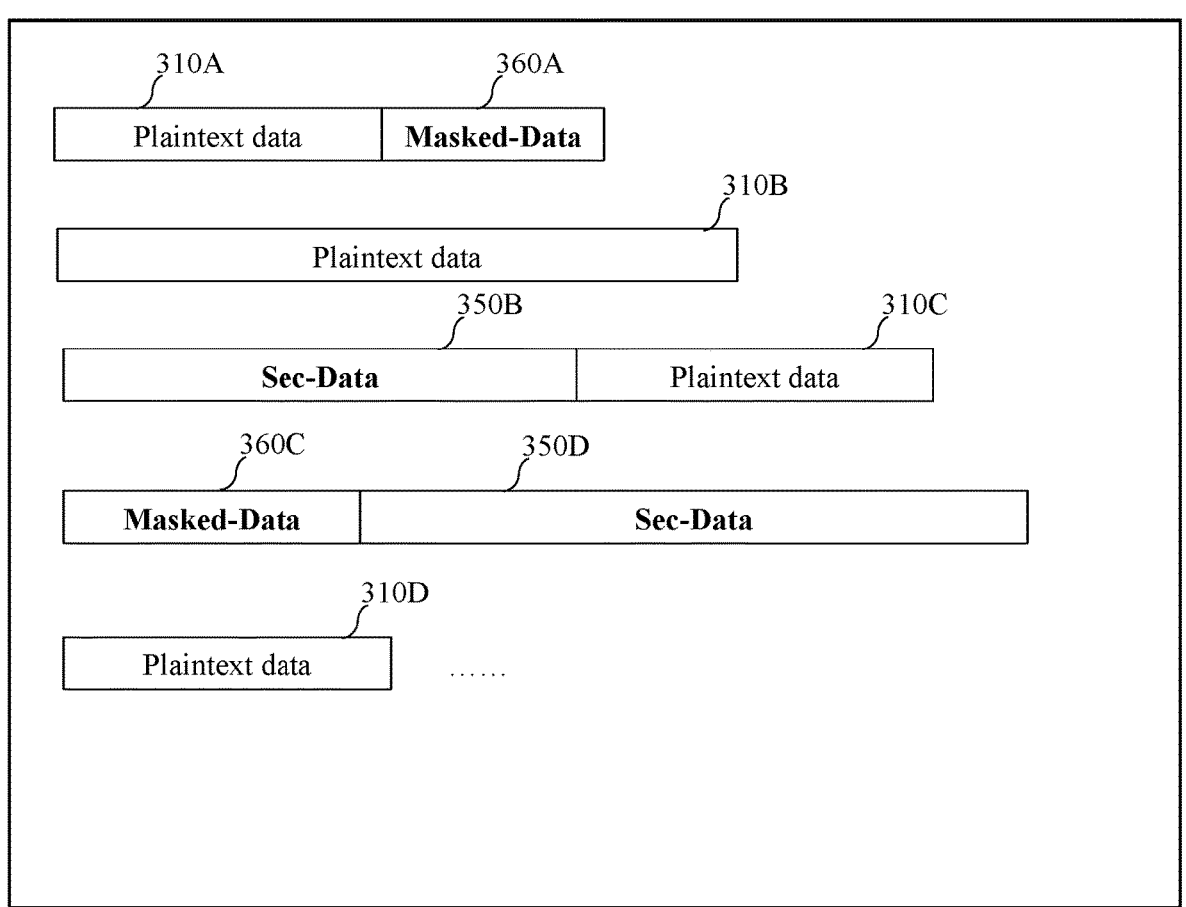

FIG. 3A is a schematic view of a logical log file 300 for a data privacy preservation database, in accordance with at least some embodiments described herein. FIG. 3B is a schematic view of an output logical log file 301 for a data privacy preservation database, in accordance with at least some embodiments described herein. FIG. 3C is a schematic view of another output logical log file 302 for a data privacy preservation database, in accordance with at least some embodiments described herein. FIG. 3D is a schematic view of yet another output logical log file 303 for a data privacy preservation database, in accordance with at least some embodiments described herein. It is to be understood that the logical log files (300, 301, 302, 303) are provided for descriptive purposes only and are not intended to be limiting. It is also to be understood that the logical log files (300, 301, 302, 303) show the sequence or order of the data, not necessary the exact location of the data in the logical log files.

It is to be understood that the logical log 300 (e.g., an audit log, etc.) may be configured or generated to record all changes made to a database (e.g., a fine-grained data privacy preservation database). The logical log 300 may be created by the DBMS (e.g., the database server, the DBMS engine, and/or the log manager of the DBMS) and may contain a record of all database commands (e.g., SQL statements, etc.) that modify the data of the database. In an example embodiment, the logical log 300 may serve as an audit trail of changes and may be used for various purposes, such as data recovery, replication, and/or database monitoring. The data or content stored in the logical log 300 may be viewed in a human-friendly format using e.g., a database command (e.g., a request to retrieve the logical log). It is also to be understood that the logical log 300 may be an unstructured file and that there is an unsatisfied need (that may be met by the features in the embodiments disclosed herein) to locate a value of a secret/private column/field in the logical log.

As described in the description of FIG. 2, a logical log (e.g., 300) may be generated or updated during the operation of the DBMS 210. In an example embodiment, in the logical log 300, any data (e.g., SQL statements, etc.), excluding the secret/private data of the secret/private column(s)/field(s), may be shown as in its original form, e.g., as plaintext data (310A, 310B, 310C, 310D, etc.). In the logical log 300, for all secret/private data of the secret/private column(s)/ field(s), a corresponding secret column/field identifier (320A, 320B, 320C, 320D, etc.), a corresponding column/ field identification (330A, 330B, 330C, 330D, etc.), and/or a corresponding length (340A, 340B, 340C, 340D, etc.) are inserted prior to the secret/private data (350A, 350B, 350C, 350D, etc.) of the secret/private column(s)/field(s). It is to be understood that the secret column/field identifier (320A, 320B, 320C, 320D, etc.) may be a predefined or predetermined constant (same for all secret column/field identifier(s)), e.g., a 256-bit (or 32-byte) constant, that may serve as an identifier for the data of the secret/private column/field. It is also to be understood that the value of the secret column/field identifier (320A, 320B, 320C, 320D, etc.) may be unique in the logical log and may be different from the value(s) of all other data/content of the logical log. It is further to be understood that the size of the column/field identification (330A, 330B, 330C, 330D, etc.) may be predefined or predetermined (e.g., 16 bytes, etc.), and the value of the column/field identification (330A, 330B, 330C, 330D, etc.) may indicate the identification of the secret/private column/field. The size of the "length" (340A, 340B, 340C, 340D, etc.) may be predefined or predetermined (e.g., two bytes, etc.), and the value of the length (340A, 340B, 340C, 340D, etc.) may indicate the length of the secret/private data (350A, 350B, 350C, 350D, etc.) of the secret/private column/field.

In an example embodiment, when a user (e.g., the user 270 of FIG. 2) is to send a request via device to retrieve the logical log 300, the device may send a database command (e.g., a logical log retrieval command, etc., via the interface 272 of the application 260 which sends the database command to the DBMS engine 230 (and/or to the Log manager 280) for execution) so that the output logical log (e.g., 301, 302, 303) may be returned to the user (e.g., via the interface 272 of the application 260 which receives the corresponding results from the DBMS engine 230) based on or in response to the request from the user. It is to be understood that the user device that issues/sends the request to the DBMS may be the owner and/or viewer of a database (e.g., a fine-grained privacy-preserving table/database having secret/private column(s)/field(s)), or any other suitable user(s) (e.g., those users to whom the secret/private column(s)/field(s) are not visible). It is also to be understood that the user's information (e.g., user's identification, etc.) may be included in the request to the DBMS.

In the example embodiment, upon receiving and in response to the user's request to retrieve the logical log 300, the DBMS engine (e.g., 230 of FIG. 2) and/or the log manager (e.g., 280 of FIG. 2) may parse the logical log 300 to detect or search for the predefined secret column/field identifier (320A, 320B, 320C, 320D, etc.). When any of the secret column/field identifier (320A, 320B, 320C, 320D, etc.) is detected or located, the DBMS engine (and/or the log manager) may mark the beginning (e.g., the beginning offset) of the location of the secret column/field identifier in the logical log 300 as L1, and read or retrieve or obtain the corresponding column/field identification (330A, 330B, 330C, 330D, etc.) in the logical log 300 to probe or search or check the "column identification" column/field in the system catalog table (e.g., the "Col-ID" column/field of the system catalog table 290 of FIG. 2).

In the example embodiment, when the DBMS engine (and/or the log manager) finds a match between the obtained corresponding column/field identification (330A, 330B, 330C, 330D, etc.) from the logical log 300 and a value in the "column identification" column/field in the system catalog table (e.g., the "Col-ID" column/field of the system catalog table 290 of FIG. 2), the DBMS engine (and/or the log manager) may search the "Owner" and/or "Viewer" field of the system catalog table to determine whether the user of the request (e.g., the logical log retrieval request) is one of the users in the "Owner" and/or "Viewer" field of the system catalog table.

In the example embodiment, if the user of the request (e.g., the logical log retrieval request) is one of the users in the "Owner" and/or "Viewer" field of the system catalog table, it may be understood that the secret/private column/field having the identification corresponding to the obtained column/field identification (330A, 330B, 330C, 330D, etc.) is visible to the user of the request (e.g., the logical log retrieval request). If the user of the request (e.g., the logical log retrieval request) is not any of the users in the "Owner" and/or "Viewer" field of the system catalog table, it may be understood that the secret/private column/field having the identification corresponding to the obtained column/field identification (330A, 330B, 330C, 330D, etc.) is not visible to the user of the request (e.g., the logical log retrieval request).

In the example embodiment, when the DBMS engine (and/or the log manager) determines that the secret/private column/field corresponds to the obtained column/field identification (330A, 330B, 330C, 330D, etc.) is visible to the user of the request, the DBMS engine (and/or the log manager) then reads or retrieves or obtains the corresponding length (340A, 340B, 340C, 340D, etc.) in the logical log 300 (e.g., two bytes, etc.) to determine the length of the secret/private data (350A, 350B, 350C, 350D, etc.), and marks the end location of the secret/private data (350A, 350B, 350C, 350D, etc.) in the logical log 300 as L2. The DBMS engine (and/or the log manager) then locate the secret/private data (350A, 350B, 350C, 350D, etc.) buffer in the logical log 300 e.g., from the starting location/address (e.g., L1+32+16+2, assuming the secret column identifier has a size of 32 bytes, the column identification has a size of 16 bytes, and the length has a size of two bytes in the logical log 300) to the ending location/address (e.g., L2) to read or retrieve the secret/private data (350A, 350B, 350C, 350D, etc.). The DBMS engine (and/or the log manager) then returns to the user device (of the request, e.g., via the interface of the application that communicates with the DBMS engine) the output logical log (e.g., 301 of FIG. 3B, 303 of FIG. 3D). It is to be understood that the logical log (301, 303) may be the logical log 300 with the secret column identifier, the column identification, and/or the length information being removed for all (e.g., 301) or some (e.g., 303) secret/private columns/fields that are visible to the user of the request. That is, when all secret/private columns/fields corresponding to the column identifications in the logical log 300 are visible to the user device of the request, the logical log 301 may be the output log. When some secret/private columns/fields corresponding to the column identifications in the logical log 300 are visible to the user device of the request, the logical log 303 may be the output log.

In the example embodiment, when the DBMS engine (and/or the log manager) determines that the secret/private column/field corresponds to the obtained column/field identification (330A, 330B, 330C, 330D, etc.) is not visible to the user of the request, the DBMS engine (and/or the log manager) then reads, retrieves, or obtains the corresponding length (340A, 340B, 340C, 340D, etc.) in the logical log 300 (e.g., two bytes, etc.) to determine the length of the secret/private data (350A, 350B, 350C, 350D, etc.), and marks the end location of the secret/private data (350A, 350B, 350C, 350D, etc.) in the logical log 300 as L2. The DBMS engine (and/or the log manager) then locates the secret/private data (350A, 350B, 350C, 350D, etc.) buffer in the logical log 300 e.g., from the starting location/address to the ending location/address (e.g., L2) to first read or retrieve and then mask the secret/private data (350A, 350B, 350C, 350D, etc.) to be masked data (360A, 360B, 360C, 360D, etc.). The the starting location/address may be e.g., L1+32+16+2, assuming the secret column identifier has a size of 32 bytes, the column identification has a size of 16 bytes, and the length has a size of two bytes in the logical log 300. The DBMS engine (and/or the log manager) then returns to the user (of the request, e.g., via the interface of the application that communicates with the DBMS engine) the output logical log (e.g., 302 of FIG. 3C, 303 of FIG. 3D) containing the masked data (360A, 360B, 360C, 360D, etc.). In an example embodiment, data being masked may indicate that the data is encoded, encrypted as ciphertext, masked by adding random value(s), and/or that the plaintext of the data is otherwise prevented from being viewed. It is to be understood that the logical log (302, 303) may be the logical log 300 with the secret column identifier, the column identification, and the length information being removed for all (e.g., 302) or some (e.g., 303) secret/private columns/fields that are visible to the user of the request. That is, when all secret/private columns/fields corresponding to the column identifications in the logical log 300 are not visible to the user of the request, the logical log 302 may be the output log. When some secret/private columns/fields corresponding to the column identifications in the logical log 300 are visible to the user of the request, the logical log 303 may be the output log.

That is, based on the logical log 300, the output logical log (301, 302, 303) may have removed therefrom all of the secret column identifier (320A, 320B, 320C, 320D, etc.), the column identification (330A, 330B, 330C, 330D, etc.), and the length (340A, 340B, 340C, 340D, etc.) information. In the output logical log (301, 302, 303), for the secret/private columns/fields (corresponding to the column identifications in the logical log 300) that are visible to the user of the request, the secret/private data (350A, 350B, 350C, 350D, etc.) may be maintained (from the logical log 300). In the output logical log (301, 302, 303), for the secret/private columns/fields (corresponding to the column identifications in the logical log 300) that are not visible to the user of the request, the original or plaintext secret/private data (350A, 350B, 350C, 350D, etc.) may not be maintained (from the logical log 300), but instead the masked data (360A, 360B, 360C, 360D, etc.) of secret/private data (350A, 350B, 350C, 350D, etc.) may replace the secret/private data (350A, 350B, 350C, 350D, etc.) and be in the output logical log (301, 302, 303).

In an example embodiment, consider that the value of the secret column identifier (320A, 320B, 320C, 320D, etc.) is 0xffffc, the column identification (330A, 330B, 330C, 330D, etc.) is 0x8001, and the secret/private data (350A, 350B, 350C, 350D, etc.) is 0x1234 (i.e. the secret/private data has a size of two bytes, or the secret/private data's size is 0x0002, or the length is 0x0002). For such secret/private data, in the logical log 300, the recorded data may be 0xffffc800100021234. The algorithm described above may search for and locate the secret column identifier 0xffffc in the logical log 300 (which indicates that there is secret data corresponding to at least one secret/private column/field). The algorithm may then read the column identification 0x8001 from the logical log 300 and probe system catalog table (e.g., 290 of FIG. 2), then read the next two bytes (the size of the length), then find the value of the length (which is 0x0002), then read two bytes to obtain/retrieve the secret data 0x1234. If the data of the secret column is visible to the device of user (of the request), the original or plaintext secret data 0x1234 may be return to the user (without the information about the secret column identifier, the column identification, and the length). If the data of the secret column is not visible to the device of the user (of the request), the original or plaintext secret data 0x1234 may be masked and the masked data may be returned to the user (without the information about the secret column identifier, the column identification, and the length). For other data (that does not have the secret column identifier (and the corresponding column identification and length) prefix), no action may be taken, and the plaintext of such data may be returned to the device of the user. It is to be understood that the data returned to the user (of the request) may be in the form of an output logical log, in the form of a data flow, or in any other suitable format.

In an example embodiment, when no secret column/field identifier (320A, 320B, 320C, 320D, etc.) is detected or located (i.e., none of the data of the secret/private columns/fields are identified) in the logical log 300, the DBMS engine (and/or the log manager) may return the logical log 300 as the output logical log to the user of the request (to retrieve the logical log).

Figure 4:
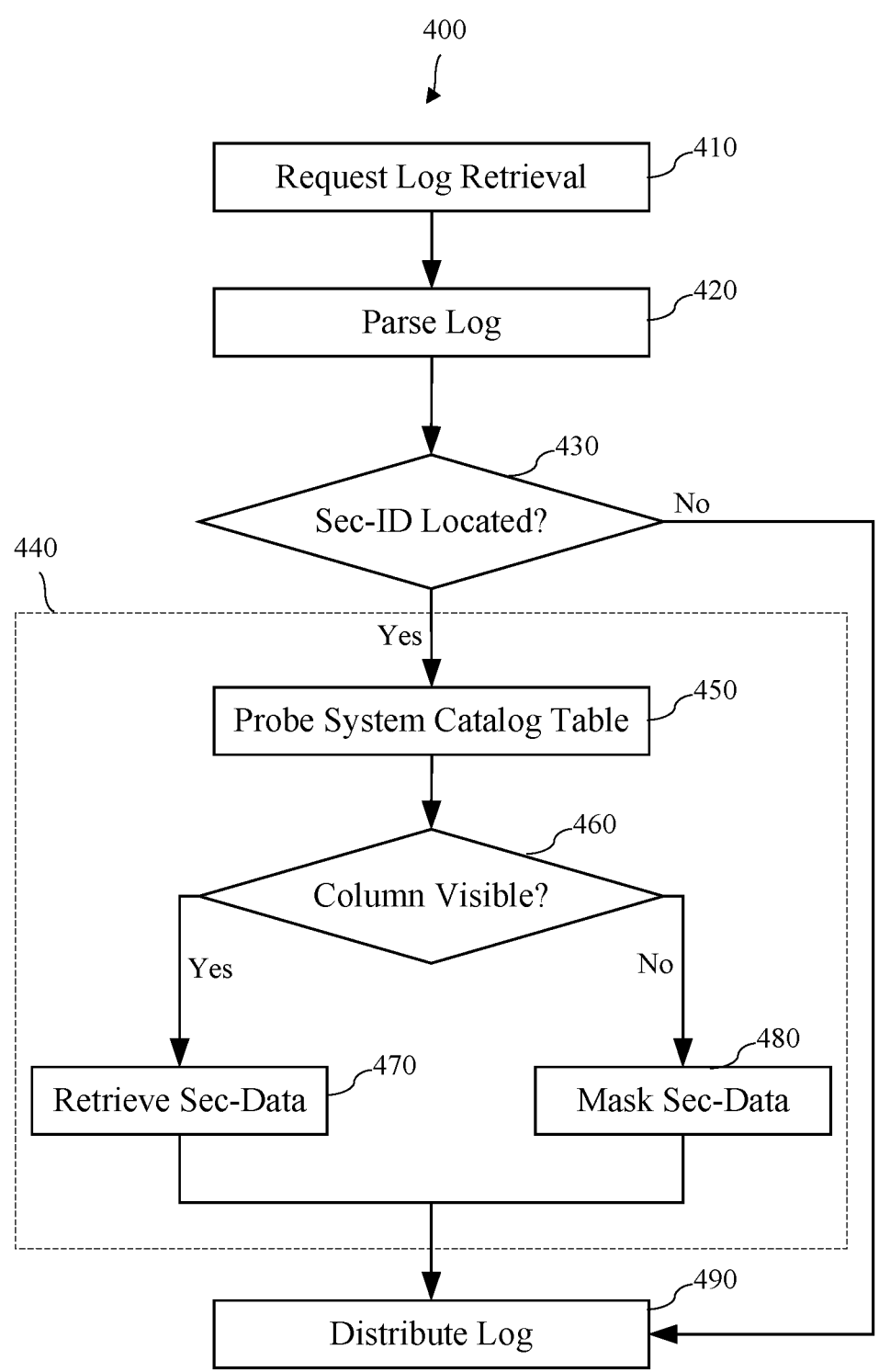
FIG. 4 is a flow chart illustrating an example processing flow for a logical log visibility control algorithm for a data privacy preservation database system in enclave, in accordance with at least some embodiments described herein.

FIG. 4 is a flow chart illustrating an example processing flow 400 for a logical log visibility control algorithm for a data privacy preservation database system in enclave, in accordance with at least some embodiments described herein.

Figure 5:
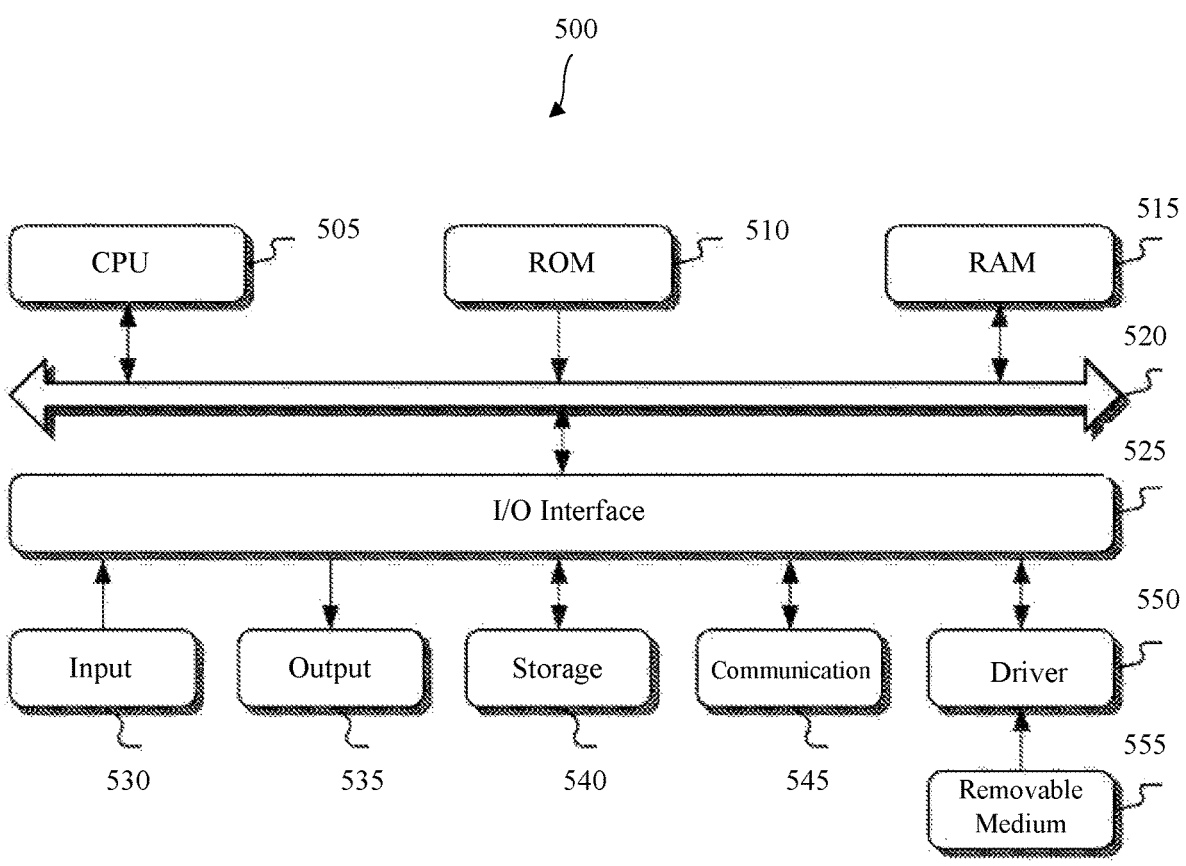
FIG. 5 is a schematic structural diagram of an example computer system applicable to implementing an electronic device, arranged in accordance with at least some embodiments described herein.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

It is also to be understood that the processing flow 400 can include one or more operations, actions, or functions as illustrated by one or more of blocks 410, 420, 430, 440, 450, 460, 470, 480, and 490. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized. It is to be understood that the processes, operations, or actions described in FIGS. 2 and 3A-3D may be implemented or performed by the processor. Processing flow 400 may begin at block 410.

At block 410 (Request Log Retrieval), the processor may receive or obtain a request (e.g., from a user via a user interface of an application that communicates with a DBMS or a DBMS engine) to retrieve the logical log (e.g., 300 of FIG. 3), e.g., of a fine-grained privacy preserving database, where the DBMS of the database or the database system is entirely resided in an enclave. Processing may proceed from block 410 to block 420.

At block 420 (Parse Log), the processor may parse or search the logical log to detect the (unique) secret column identifier in the logical log, and processing may proceed from block 420 to block 430.

At block 430 (Sec-ID Located?), if no secret column identifier is identified or located in the logical log, processing may proceed from block 430 to block 490. If at least one secret column identifier is identified or located in the logical log, processing may proceed from block 430 to block 440, which includes blocks 450, 460, 470, and/or 480 to perform actions or operations for each secret column identifier being identified or located in the logical log.

At block 450 (Probe System Catalog Table), the processor may read, obtain, or retrieve the corresponding column identification (immediately following the identified secret column identifier) in the logical log. The processor may probe or search the system catalog table (e.g., 290 of FIG. 2) to find or locate the row/record of the system catalog table that has a column identification that matches the retrieved/obtained column identification of the logical log. The processor may then search or check the located row/record of the system catalog table to find or locate the owner and/or viewer(s) information in the located row/record of the system catalog table. If the user of the request is one of the owner and/or viewer(s), (the data of) the secret column that corresponds to the column identification (of the logical log or of the system catalog table) may be visible to the user of the request. If the user of the request is not any of the owner and/or viewer(s), (the data of) the secret column that corresponds to the column identification (of the logical log or of the system catalog table) may not be visible to the user of the request. Processing may proceed from block 450 to block 460.

At block 460 (Column visible), if (the data of) the secret column that corresponds to the column identification (of the logical log or of the system catalog table) is visible to the user device of the request, processing may proceed from block 460 to block 470. If (the data of) the secret column that corresponds to the column identification (of the logical log or of the system catalog table) is not visible to the user device of the request, processing may proceed from block 460 to block 480.

At block 470 (Retrieve Sec-Data), the processor may read, obtain, or retrieve the corresponding length (immediately following the obtained or retrieved column identification) in the logical log. The value of the length may indicate the size of the corresponding secret data (immediately following the obtained or retrieved length) in the logical log. The secret data is the data of the secret column that corresponds to the column identification. The processor may read, obtain, or retrieve the corresponding secret data based on the length information. The processor may also remove or delete the corresponding secret column identifier, column identification, and length information (e.g. from the logical log). Processing may proceed from block 470 back to block 450 and repeat the processes until all of the identified or located secret column identifiers are processed.

At block 480 (Mask Sec-Data), the processor may read, obtain, or retrieve the corresponding length (immediately following the obtained or retrieved column identification) in the logical log. The value of the length may indicate the size of the corresponding secret data (immediately following the obtained or retrieved length) in the logical log. The secret data is the data of the secret column that corresponds to the column identification. The processor may read, obtain, or retrieve the corresponding secret data based on the length information. The processor may mask the secret data (e.g., by replacing the secret data with the masked data, or by mask the secret data in place, etc.) The processor may also remove or delete the corresponding secret column identifier, column identification, and length information (e.g. from the logical log). Processing may proceed from block 480 back to block 450 and repeat the processes until all of the identified or located secret column identifiers are processed.

After all of the identified or located secret column identifiers are processed, processing may proceed from bock 440 (e.g., block 470 or block 480) to block 490. It is to be understood that for the data in the logical log that does not have a prefix of the secret column identifier (followed by the corresponding column identification and length), no actions may be taken and the data may be maintained in the logical log (and/or returned to the user) without any modification.

At block 490 (Distribute Log), the processor may return or distribute the output logical log to the user of the request (e.g., via the user interface of the application that communicates with the DBMS or the DBMS engine). The output logical log may be (1) the original logical log updated at block 470 and/or block 480, (2) a new logical log generated or created based on the original logical log (e.g., a copy of the original logical log) and then updated at block 470 and/or block 480 (e.g., to remove the corresponding secret column identifier, corresponding column identification, and length, and/or to mask the secret data, etc.), (3) data flow reflecting (1) or (2), i.e., data flow (i) including the secret data and/or the masked data depending on the visibility, (ii) including the data that does not have a prefix of the secret column identifier (followed by the corresponding column identification and length), but (iii) excluding the secret column identifier (if any) and the corresponding column identification and length, and/or (4) any other suitable format or form.

FIG. 5 is a schematic structural diagram of an example computer system 500 applicable to implementing an electronic device (for example, the server or one of the terminal devices shown in FIG. 1), arranged in accordance with at least some embodiments described herein. It is to be understood that the computer system shown in FIG. 5 is provided for illustration only instead of limiting the functions and applications of the embodiments described herein.

As depicted, the computer system 500 may include a central processing unit (CPU) 505. The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display (LCD), a speaker, or the like; a storage device 540 including a hard disk or the like; and a communication device 545 including a network interface card such as a LAN card, a modem, or the like. The communication device 545 may perform communication processing via a network such as the Internet, a WAN, a LAN, a LIN, a cloud, etc. In an embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowchart of FIG. 4 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

ASPECTS

It is appreciated that any one of aspects can be combined with each other.

Aspect 1. A database management system (DBMS) in an enclave for a data privacy preservation database, the system comprising: a system catalog table; a logical log; and a DBMS engine configured to: parse the logical log based on a request to retrieve the logical log to detect at least one predetermined identifier, for each predetermined identifier being detected in the logical log: determine an access control of the request with respect to a field of the data privacy preservation database corresponding to a record in the system catalog table, retrieve secret data corresponding to the field when the access control indicating a first access control status, or mask the secret data corresponding to the field when the access control indicating a second access control status, and distribute the logical log having the retrieved or masked secret data based on the request.

Aspect 2. The system of aspect 1, wherein for each predetermined identifier in the logical log, the logical log includes an identification of the field, a length of the secret data, and the secret data.

Aspect 3. The system of aspect 2, wherein for each predetermined identifier in the logical log, the engine is further configured to remove the predetermined identifier, the identification of the field, and the length of the secret data from the logical log before the logical log is distributed.

Aspect 4. The system of aspect 2, wherein the record in the system catalog table includes an identification of the field and one or more user identifications.

Aspect 5. The system of aspect 4, wherein the engine is to further: determine the access control of the request based on the one or more user identifications when the identification of the field in the record matches the identification of the field in the logical log.

Aspect 6. The system of aspect 5, wherein the engine is to further: when the request is from a first user corresponding to the one or more user identifications, configure the access control to the first access control status, and when the request is from a second user that does not correspond to the one or more user identifications, configure the access control to the second access control status.

Aspect 7. The system of any one of aspects 1-6, wherein the first access control status is indicative of the field being visible to a user of the request, the second access control status is indicative of the field being invisible to the user.

Aspect 8. The system of any one of aspects 1-7, wherein the entire system is in the enclave for runtime execution.

Aspect 9. The system of any one of aspects 1-8, wherein the data privacy preservation database is a fine-grained data privacy preservation database.

Aspect 10. A method for data privacy control for a data privacy preservation database, the method comprising: parsing, by a database management system (DBMS) in an enclave, a logical log based on a request to retrieve the logical log to detect at least one predetermined identifier; for each predetermined identifier being detected in the logical log: determining an access control of the request with respect to a field of the data privacy preservation database corresponding to a record in a system catalog table, retrieving secret data corresponding to the field when the access control indicating a first access control status, or masking the secret data corresponding to the field when the access control indicating a second access control status, and distributing the logical log having the retrieved or masked secret data based on the request.

Aspect 11. The method of aspect 10, wherein for each predetermined identifier in the logical log, the logical log includes an identification of the field, a length of the secret data, and the secret data.

Aspect 12. The method of aspect 11, further comprising: for each predetermined identifier in the logical log, removing the predetermined identifier, the identification of the field, and the length of the secret data from the logical log before distributing the logical log.

Aspect 13. The method of aspect 11, wherein the record in the system catalog table includes an identification of the field and one or more user identifications.

Aspect 14. The method of aspect 13, further comprising: determining the access control of the request based on the one or more user identifications when the identification of the field in the record matches the identification of the field in the logical log.

Aspect 15. The method of aspect 14, further comprising: when the request is from a first user corresponding to the one or more user identifications, configuring the access control to the first access control status; and when the request is from a second user that does not correspond to the one or more user identifications, configuring the access control to the second access control status.

Aspect 16. A non-transitory computer-readable medium having computer-executable instructions stored thereon that, upon execution, cause one or more processors to perform operations comprising: parsing, by a database management system (DBMS) in an enclave, a logical log based on a request to retrieve the logical log to detect at least one predetermined identifier; for each predetermined identifier being detected in the logical log: determining an access control of the request with respect to a field of a data privacy preservation database corresponding to a record in a system catalog table, retrieving secret data corresponding to the field when the access control indicating a first access control status, or masking the secret data corresponding to the field when the access control indicating a second access control status, and distributing the logical log having the retrieved or masked secret data based on the request.

Aspect 17. The computer-readable medium of aspect 16, wherein for each predetermined identifier in the logical log, the logical log includes an identification of the field, a length of the secret data, and the secret data.

Aspect 18. The computer-readable medium of aspect 17, the operations further comprise: for each predetermined identifier in the logical log, removing the predetermined identifier, the identification of the field, and the length of the secret data from the logical log before distributing the logical log.

Aspect 19. The computer-readable medium of aspect 17, wherein the record in the system catalog table includes an identification of the field and one or more user identifications.

Aspect 20. The computer-readable medium of aspect 19, the operations further comprise: determining the access control of the request based on the one or more user identifications when the identification of the field in the record matches the identification of the field in the logical log.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A database management system (DBMS) in an enclave that comprises at least one memory and at least one processor, the DBMS comprising:

a system catalog table;

a logical log; and a DBMS engine in the enclave configured to:

parse the logical log based on a request to retrieve the logical log to detect at least one predetermined identifier;

for each predetermined identifier being detected in the logical log:

determine an access control of the request with respect to a field of the system catalog table of a data privacy preservation database corresponding to a record in the system catalog table, and retrieve secret data corresponding to the field when the access control indicating a first access control status or mask the secret data corresponding to the field when the access control indicating a second access control status; and distribute the logical log having the retrieved or masked secret data based on the request, wherein for each predetermined identifier in the logical log, the logical log includes an identification of the field, a length of the secret data corresponding to the field, and the secret data corresponding to the field.

2. The DBMS of claim 1, wherein for each predetermined identifier in the logical log, the DBMS engine is further configured to remove the predetermined identifier, the identification of the field, and the length of the secret data corresponding to the field from the logical log before the logical log is distributed.

3. The DBMS of claim 1, wherein the record in the system catalog table includes the identification of the field and one or more user identifications.

4. The DBMS of claim 3, wherein the DBMS engine is further configured to:

determine the access control of the request based on the one or more user identifications when the identification of the field in the record matches the identification of the field in the logical log.

5. The DBMS of claim 4, wherein the DBMS engine is further configured to:

when the request is from a first user corresponding to the one or more user identifications, configure the access control to the first access control status; and when the request is from a second user that does not correspond to the one or more user identifications, configure the access control to the second access control status.

6. The DBMS of claim 1, wherein the first access control status is indicative of the field being visible to a user of the request, and the second access control status is indicative of the field being invisible to the user.

7. The DBMS of claim 1, wherein the DBMS is in the enclave for runtime execution.

8. A method for data privacy control, the method comprising:

parsing, by a database management system (DBMS) in an enclave, a logical log based on a request to retrieve the logical log to detect at least one predetermined identifier;

for each predetermined identifier being detected in the logical log:

determining an access control of the request with respect to a field of a system catalog table of a data privacy preservation database corresponding to a record in the system catalog table, and retrieving secret data corresponding to the field when the access control indicating a first access control status or masking the secret data corresponding to the field when the access control indicating a second access control status; and distributing the logical log having the retrieved or masked secret data based on the request, wherein for each predetermined identifier in the logical log, the logical log includes an identification of the field, a length of the secret data corresponding to the field, and the secret data corresponding to the field.

9. The method of claim 8, further comprising:

for each predetermined identifier in the logical log, removing the predetermined identifier, the identification of the field, and the length of the secret data corresponding to the field from the logical log before distributing the logical log.

10. The method of claim 8, wherein the record in the system catalog table includes the identification of the field and one or more user identifications.

11. The method of claim 10, further comprising:

determining the access control of the request based on the one or more user identifications when the identification of the field in the record matches the identification of the field in the logical log.

12. The method of claim 11, further comprising:

when the request is from a first user corresponding to the one or more user identifications, configuring the access control to the first access control status; and when the request is from a second user that does not correspond to the one or more user identifications, configuring the access control to the second access control status.

13. The method of claim 8, wherein the first access control status is indicative of the field being visible to a user of the request, and the second access control status is indicative of the field being invisible to the user.

14. A non-transitory computer-readable medium having computer-executable instructions stored thereon that, upon execution, cause one or more processors to perform operations comprising:

parsing, by a database management system (DBMS) in an enclave, a logical log based on a request to retrieve the logical log to detect at least one predetermined identifier;

for each predetermined identifier being detected in the logical log:

determining an access control of the request with respect to a field of a system catalog table of a data privacy preservation database corresponding to a record in the system catalog table, and retrieving secret data corresponding to the field when the access control indicating a first access control status or masking the secret data corresponding to the field when the access control indicating a second access control status; and distributing the logical log having the retrieved or masked secret data based on the request, wherein for each predetermined identifier in the logical log, the logical log includes an identification of the field, a length of the secret data corresponding to the field, and the secret data corresponding to the field.

15. The computer-readable medium of claim 14, wherein the operations further comprise:

for each predetermined identifier in the logical log, removing the predetermined identifier, the identification of the field, and the length of the secret data corresponding to the field from the logical log before distributing the logical log.

16. The computer-readable medium of claim 14, wherein the record in the system catalog table includes the identification of the field and one or more user identifications.

17. The computer-readable medium of claim 16, wherein the operations further comprise:

determining the access control of the request based on the one or more user identifications when the identification of the field in the record matches the identification of the field in the logical log.

* * * * *